(12) United States Patent
Schneider (10) Patent No.: US 8,474,786 B2
(45) Date of Patent: Jul. 2, 2013

(54) VALVE STEM AND VALVE PLUG APPARATUS FOR USE WITH FLUID REGULATORS

(75) Inventor: Gregg Alan Schneider, Corinth, TX (US)

(73) Assignee: Emerson Process Management Regulator Technologies, Inc., McKinney, TX (US)

(*) Notice: Subject to any disclaimer, the term of this patent is extended or adjusted under 35 U.S.C. 154(b) by 343 days.

(21) Appl. No.: 12/786,093

(22) Filed: May 24, 2010

(65) Prior Publication Data
US 2011/0284102 A1    Nov. 24, 2011

(51) Int. Cl.
*F16K 31/44*    (2006.01)

(52) U.S. Cl.
USPC .................. 251/81; 251/77; 251/79; 251/80; 137/494

(58) Field of Classification Search
USPC .................. 251/77, 79, 80, 284; 137/494
See application file for complete search history.

(56) References Cited

U.S. PATENT DOCUMENTS

| | | | |
|---|---|---|---|
| 1,212,102 A * | 1/1917 | Pipe | 137/553 |
| 1,810,620 A * | 6/1931 | Parks | 251/77 |
| 2,496,679 A * | 2/1950 | Saurer | 251/85 |
| 2,942,617 A * | 6/1960 | Gilliam | 137/454.6 |
| 3,779,280 A * | 12/1973 | Evans et al. | 137/625.5 |
| 3,974,861 A * | 8/1976 | Goto et al. | 137/627.5 |
| 4,066,090 A * | 1/1978 | Nakajima et al. | 137/62 |
| 4,295,489 A * | 10/1981 | Arends et al. | 137/488 |
| 4,309,022 A * | 1/1982 | Reinicke et al. | 251/61.4 |
| 4,319,607 A * | 3/1982 | Fields | 137/625.5 |
| 5,524,592 A * | 6/1996 | Woody et al. | 123/510 |
| 6,994,928 B2 * | 2/2006 | Gagnon et al. | 429/423 |

FOREIGN PATENT DOCUMENTS

| | | |
|---|---|---|
| AU | 471884 | 5/1976 |
| GB | 1229162 | 4/1971 |
| WO | 2006092401 | 9/2006 |

OTHER PUBLICATIONS

International Searching Authority, "International Search Report," issued in connection with application serial No. PCT/US2011/036850, mailed Sep. 5, 2011, 2 pages.

International Searching Authority, "Written Opinion of the International Searching Authority," issued in connection with application serial No. PCT/US2011/036850, mailed Sep. 5, 2011, 8 pages.

Emerson Process Management, "Type 655 and 655R Actuators for Self-Operated Control," Product Bulletin, Aug. 2002, 8 pages.

Dresser Masoneilan, "10900 Series Actuators," Specification Data, Sep. 1996, 8 pages.

(Continued)

*Primary Examiner* — John K Fristoe, Jr.
*Assistant Examiner* — Umashankar Venkatesan
(74) *Attorney, Agent, or Firm* — Hanley, Flight & Zimmerman, LLC (57) ABSTRACT

Valve stem and valve plug apparatus for use with fluid regulators are described herein. An example fluid regulator includes a flow control member having a body that includes a longitudinal bore between a first end and a second end and a valve stem is disposed in the bore of the flow control member. A connector slidably couples the valve stem and the flow control member such that the connector moves away from the flow control member to relieve the flow control member of a loading force imparted by a loading element of the fluid regulator when the flow control member sealingly engages a valve seat of the fluid regulator.

20 Claims, 5 Drawing Sheets

OTHER PUBLICATIONS

Samson, "Universal Excess Pressure Valve Type 41-73," May 2010, 6 pages.

Samson, "Universal Pressure Reducing Valve Type 41-23," Nov. 2006, 6 pages.

* cited by examiner

VALVE STEM AND VALVE PLUG APPARATUS FOR USE WITH FLUID REGULATORS

FIELD OF THE DISCLOSURE

The present disclosure relates generally to fluid regulators and, more particularly, to valve stem and valve plug apparatus for use with fluid regulators.

BACKGROUND

Process control systems utilize a variety of field devices to control process parameters. Fluid regulators are commonly distributed throughout process control systems to control the pressures of various fluids (e.g., liquids, gasses, etc.). In general, back pressure fluid regulators modulate or regulate a sensed upstream pressure to maintain upstream process system pressures within acceptable and/or constant pressure limits. For example, a back-pressure fluid regulator typically regulates a pressure of a high pressure fluid source to prevent high pressure fluid from reaching instruments or control devices upstream from the back-pressure regulator.

Some known back pressure fluid regulators include a diaphragm operatively coupled to a valve plug via a valve stem to move the valve plug relative to a valve seat to prevent or allow fluid flow between an inlet and an outlet. For example, back pressure fluid regulators typically regulate an upstream fluid pressure using a pre-set control force or load applied to a first side of the diaphragm to urge the valve plug in a first direction (e.g., a closed direction in which the valve plug sealingly engages the valve seat). A second side of the diaphragm is fluidly coupled to the inlet fluid or upstream pressure to apply a force to urge the diaphragm in a second direction opposite the first direction. Thus, the diaphragm moves the valve plug in response to a difference between the pressure of the fluid at the inlet (i.e., the force applied to the second side of the diaphragm) and the pre-set control force (i.e., the force applied to the first side of the diaphragm) to vary the flow through the regulator to maintain or regulate the desired upstream pressure.

The valve plug and the valve stem are often rigidly coupled together via a fastener so that the valve plug always moves together with the diaphragm. Thus, the valve plug always remains operatively coupled to the diaphragm and the pre-set control or load. As a result, when the valve plug sealingly engages the valve seat, the pre-set force is imparted on a seal (e.g., an elastomeric O-ring) of the valve plug. However, such a connection between the valve plug and the valve stem is disadvantageous because when a control pressure is absent from the sensing chamber during, for example, maintenance or shipment of the fluid regulator, the pre-set load or force can impart a relatively high seat load to the valve plug when the valve plug engages the valve seat. Such relatively high seat load can damage the seal (e.g., an elastomeric seal) of the valve plug, thereby causing the regulator to leak during operation.

SUMMARY

In one example, a fluid regulator includes a flow control member has a body that includes a longitudinal bore between a first end and a second end and a valve stem is disposed in the bore of the flow control member. A connector slidably couples the valve stem and the flow control member such that the connector moves away from the flow control member to relieve the flow control member of a loading force imparted by a loading element of the fluid regulator when the flow control member sealingly engages a valve seat of the fluid regulator.

In another example, a fluid regulator includes a plug having a bore therethrough. A stem is slidably coupled to the plug via the bore to allow the stem to move through the bore when the plug is engaged with a seat of the fluid regulator. The stem includes a head to engage the plug to move the plug away from the seat. A spring is coupled to the plug to hold the plug in sealing engagement with the seat when the head is disengaged from the plug.

DETAILED DESCRIPTION

The example back pressure fluid regulator described herein operatively disengages or decouples a loading element from a flow control member when the flow control member is in sealing engagement with a valve seat to prevent or restrict fluid flow through the fluid regulator (e.g., a closed position), and operatively couples the loading element and the flow control member to move the flow control member away from the valve seat to allow fluid flow though the fluid regulator (e.g., an open position). More specifically, the loading element is operatively disengaged from the flow control member by allowing a valve stem to slide through the flow control member when the flow control member sealingly engages the valve seat. Allowing the valve stem to slide through the flow control member when the flow control member sealingly engages the valve seat, reduces or relieves a seat load or force imparted to the flow control member by the loading element (e.g., a control spring) of the fluid regulator. Such a configuration can significantly reduce damage to the flow control member (e.g., to a seal of the flow control member) during, for example, maintenance or shipment of the fluid regulator. In particular, a pre-set pressure or force of the loading element may be adjusted or set by a manufacturer prior to shipment of the fluid valve to a customer without imparting a relatively large load to a seal of the flow control member.

Figure 1A:
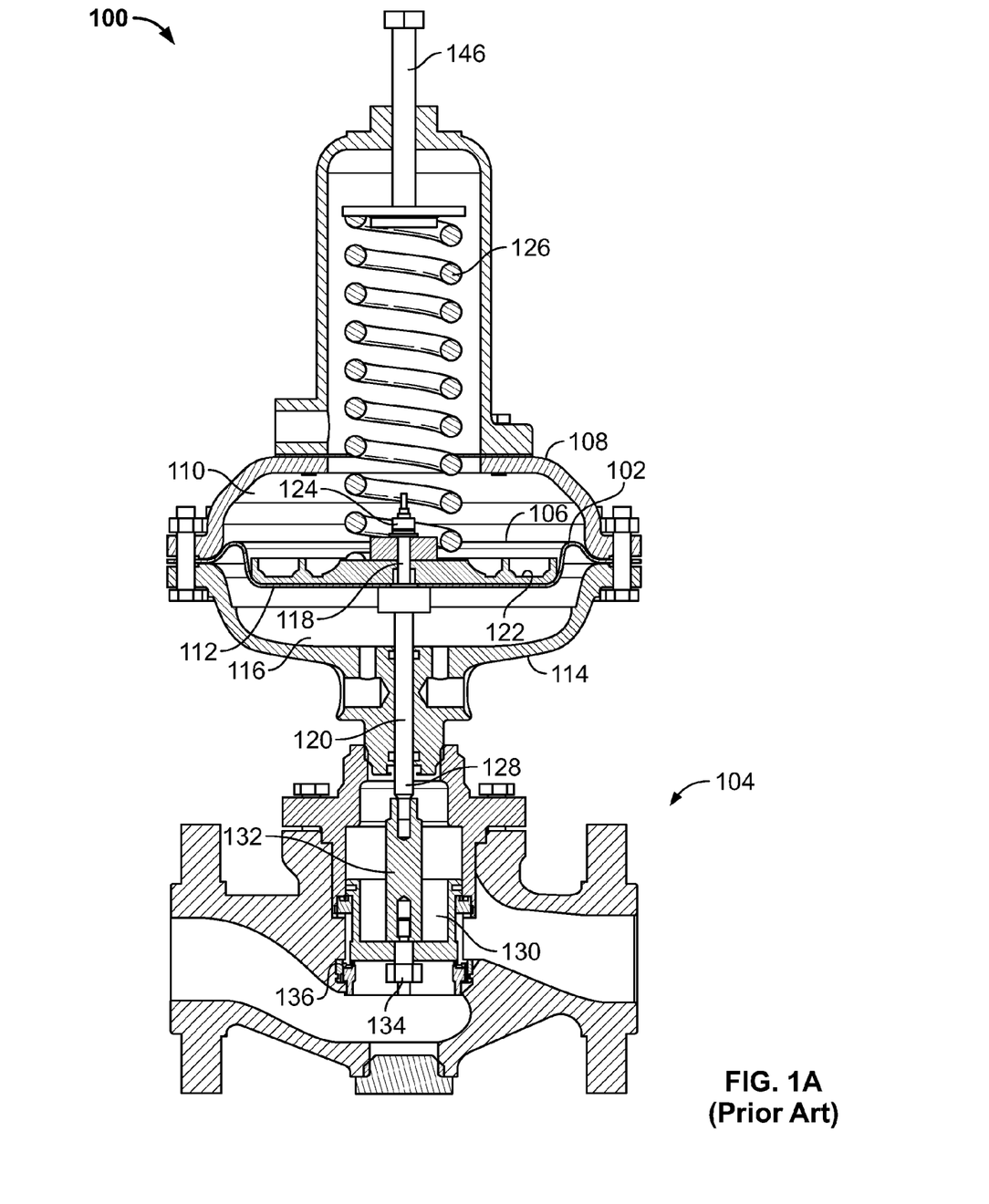
FIG. 1A illustrates a known fluid regulator.
Figure 1B:
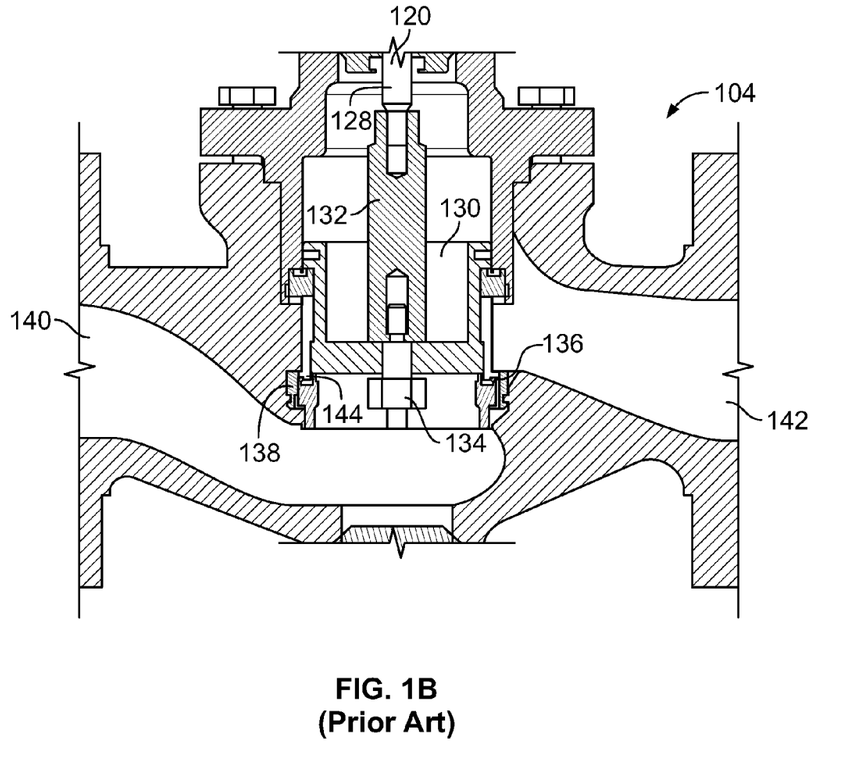
FIG. 1B illustrates an enlarged portion of the known fluid regulator of FIG. 1A.

Before discussing an example back pressure fluid regulator described herein, a brief description of a known spring-loaded, back-pressure fluid regulator 100 is provided in FIG. 1A. FIG. 1B illustrates an enlarged portion of the fluid regulator 100 of FIG. 1A. As shown in FIGS. 1A and 1B, the fluid regulator 100 includes a sensing element or diaphragm 102 operatively coupled to a valve 104. A first side or surface 106 of the diaphragm 102 and an upper casing 108 define a first chamber 110 and a second side or surface 112 of the diaphragm 102 and the lower casing 114 define a second or sensing chamber 116. A first end 118 of a valve stem 120 is rigidly coupled to the diaphragm 102 via a diaphragm plate 122 and a fastener 124. A loading element 126 is coupled to the diaphragm 102 to provide a pre-set force or load to the first side 106 of the diaphragm 102 to bias the diaphragm 102 toward the sensing chamber 116.

As shown most clearly in FIG. 1B, a second end 128 of the valve stem 120 is fixedly or rigidly coupled to a valve plug 130 of the valve 104 via a coupling 132 and a fastener 134. The valve plug 130 also includes a seal 136 (e.g., an elastomeric O-ring seal) that sealingly engages a valve seat 138 to prevent the fluid flow between an inlet 140 and an outlet 142 when the fluid regulator 100 is in a closed position (as shown in FIGS. 1A and 1B). The seal 136 sealingly engages an orifice 144 (e.g., a knife-edge orifice) defined by the valve seat 138 to provide a substantially tight shut-off to prevent or restrict fluid flow through the fluid regulator 100.

In operation, the fluid regulator 100 regulates the pressure of an upstream fluid at the inlet 140. The loading element 126 provides a predetermined or pre-set force toward the first side 106 of the diaphragm 102. The sensing chamber 116 senses the pressure of the upstream fluid at the inlet 140 (i.e., a control pressure) via a sensing line (not shown). A pressure differential across the diaphragm 102 provided by the loading element 126 and the pressure of the fluid in the sensing chamber 116 causes the diaphragm 102 and, thus, the valve plug 130 to move toward or away from the valve seat 138 to restrict or allow fluid flow between the inlet 140 and the outlet 142. Movement of the diaphragm 102 causes the valve plug 130 to move toward or away from the valve seat 138 because the valve plug 130 is rigidly coupled to the diaphragm 102 and the loading element 126 via the valve stem 120. Therefore, the loading element 126 always remains operatively coupled to the valve plug 130 when the valve plug 130 is in sealing engagement with the valve seat 138. In other words, the loading element 126 always imparts a load to the valve plug 130 when the valve plug 130 sealingly engages the valve seat 138.

The pre-set force may be adjusted or increased via an adjustor 146. Thus, in some applications, the pre-set force may be adjusted to impart a relatively high force. In the absence of a control pressure in the sensing chamber 116, the force exerted by the loading element 126 imparts a relatively high seat load or force to the valve plug 130 when the valve plug 130 is in engagement with the valve seat 138. As a result, the seal 136 of the valve plug 130 sealingly engages the orifice 144 of the valve seat 138 under a relatively high seat load exerted by the loading element 126 because the valve plug 130 and the valve stem 120 are rigidly coupled (i.e., the valve seat 138 also functions to provide a mechanical stop).

Such relatively high seat loads imparted on the seal 136 may cause the seal 136 to become damaged (e.g., cracked), thereby causing unwanted leakage across the valve seat 138 during operation when the fluid regulator 100 is in a closed position. Thus, for example, during maintenance or during shipment of the fluid regulator 100, in which a control pressure is relieved from the sensing chamber 116, the loading element 126 may impart a relatively large seat load to the valve plug 130, which can cause damage to the seal 136.

Figure 2A:
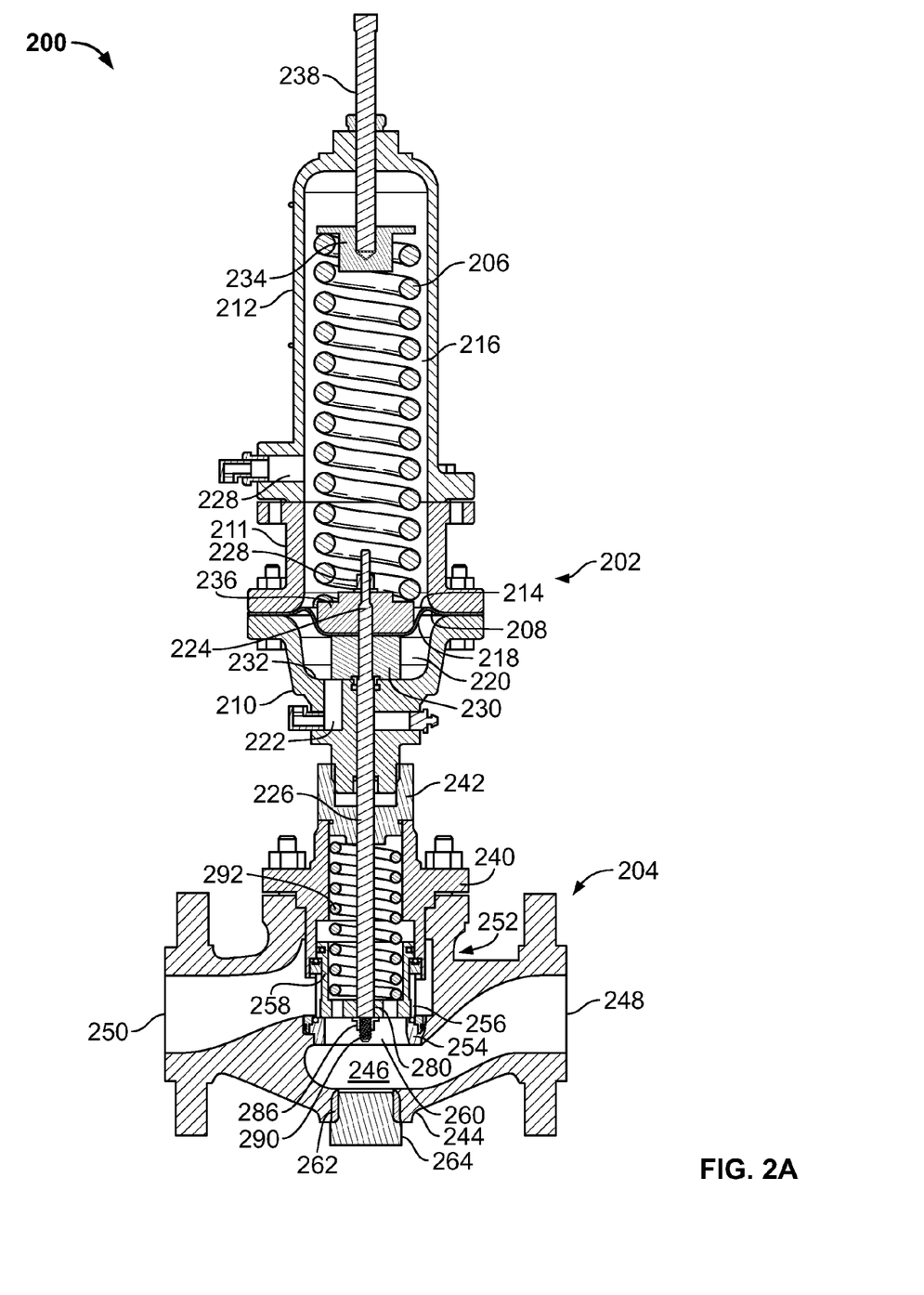
FIG. 2A illustrates an example fluid regulator described herein.

FIG. 2 illustrates an example fluid regulator 200 implemented with an example valve stem and flow control member connection described herein. As shown in FIG. 2, fluid regulator 200 includes a sensing apparatus and actuator assembly 202 operatively coupled to a fluid flow control device or fluid valve 204 (e.g., a sliding stem valve). A loading element 206 is operatively coupled to the actuator assembly 202 to provide a pre-set force or load. As shown, the fluid regulator 200 is a back pressure regulator that regulates the pressure of an upstream pressure source (not shown) to the pre-set load provided by the loading element 206. For example, the example fluid regulator 200 may be used to maintain a control pressure of a re-circulating pressure system, relieve excess system pressures to protect pressure sensitive devices (e.g., upstream of the pressure system), etc. Thus, the back-pressure regulator 200 is configured to relieve or reduce excess fluid pressure when a pressurized fluid has a pressure greater than a desired operating pressure suitable for use by the various instruments or control devices receiving the pressurized fluid.

The actuator 202 includes a sensing element or a diaphragm 208 disposed between a lower casing 210 and an upper or spring casing 212. In this example, the actuator 202 includes a spacer 211 to enlarge the envelope of the actuator 202 to contain the loading element 206. However, in other examples, the lower casing 210 may be coupled directly to the upper casing 212. As shown, the diaphragm 208 is captured between the spacer 211 and the lower casing 210. A first side 214 of the diaphragm 208 and the upper casing 212 define an upper or loading chamber 216, and a second side 218 of the diaphragm 208 and the lower casing 210 define a lower or sensing chamber 220. The sensing chamber 220 is fluidly coupled to an upstream pressure source (not shown) via a port 222 and a sensing line (not shown) in fluid communication with the upstream pressure. A first end 224 of a valve stem 226 is fixedly or rigidly coupled to the diaphragm 208 via a fastener 228 and a diaphragm head 230. In this example, as described in greater detail below, the diaphragm head 230 engages a surface 232 of the lower casing 210 to limit movement or travel of the valve stem 226 toward the fluid valve 204. Thus, the diaphragm head 230 limits the amount of deflection of the diaphragm 208 beyond a predetermined distance to prevent damage to the diaphragm 208.

In this example, the loading element 206 is a control spring disposed in the loading chamber 216 of the upper casing 212 between an upper spring seat 234 (e.g., a movable or adjustable spring seat) and a lower spring seat 236. The loading element 206 is operatively coupled to the diaphragm 208 via the lower spring seat 236 to provide a pre-set load or force to bias the diaphragm 208 toward the lower casing 210. The amount of force exerted by the loading element 206 to the diaphragm 208 can be adjusted (e.g., increased or decreased) via an adjustor 238 (e.g., a knob or screw). The adjustor 238 is coupled to the upper spring seat 234 such that turning the adjustor 238 in a first direction (e.g., clockwise) causes the loading element 206 to exert a greater force on the first side 214 of the diaphragm 208, and turning the adjustor 238 in a second direction (e.g., counterclockwise) causes the loading element 206 to reduce the amount of force exerted on the first side 214 of the diaphragm 208. Thus, the loading element 206 opposes a force in the sensing chamber 220 provided by the upstream fluid pressure.

As shown, the lower casing 210 is coupled to the fluid valve 204 via a flange 240 and an adaptor 242. The fluid valve 204 includes a regulator body 244 that defines a fluid flow passageway 246 between an inlet 248 and an outlet 250. The inlet 248 is fluidly coupled to an upstream pressure source or system (e.g., an outlet of a pump system) and the outlet 250 may be fluidly coupled to a low pressure system (e.g., a reservoir, distribution system, etc.). The fluid valve 204 includes a valve trim assembly 252 disposed within the regulator body 244 to regulate or restrict the fluid flow between the inlet 248 and the outlet 250. In this example, the valve trim assembly 252 includes a valve seat 254 (e.g., a soft-seat), a cage 256 and a flow control member or valve plug 258. The cage 256 retains the valve seat 254 within the regulator body 244 when the cage 256 is coupled to the fluid valve 204. The valve seat 254 defines an orifice 260 through which fluid may flow between the inlet 248 and the outlet 250. In this example, the regulator body 244 also includes an access port 262 that receives a removable plug 264.

Figure 2B:
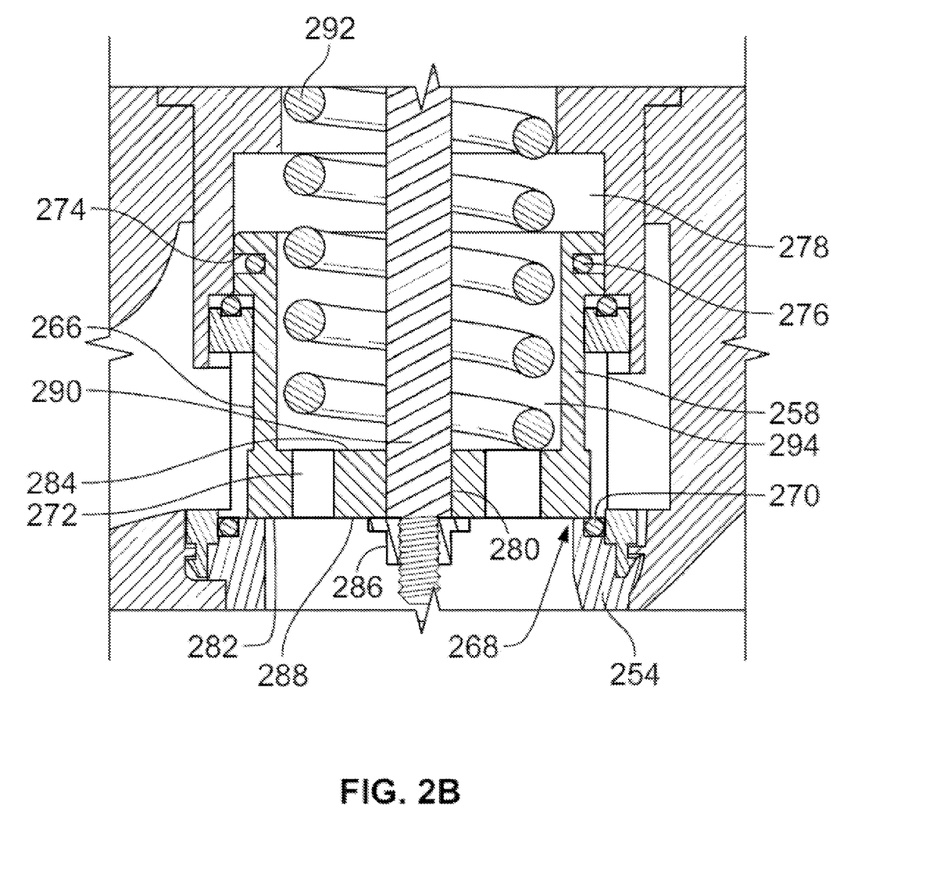
FIG. 2B illustrates an enlarged portion of the example fluid regulator of FIG. 2A

As most clearly shown in FIG. 2B, the flow control member 258 is depicted as a valve plug having a cylindrical body 266 that includes a seal receiving area 268. A seal 270 (e.g., an O-ring) composed of elastomeric material is disposed in the seat receiving area 268 and sealingly engages the valve seat 254 to prevent or restrict fluid flow between the inlet 248 and the outlet 250 when the fluid regulator 200 is in a closed position.

In this example, the flow control member 258 includes channels or conduits 272 to substantially balance or equalize the forces exerted across the flow control member 258 by the pressures of the upstream process fluid at the inlet 248 acting across the flow control member 258. As a result, a smaller load force can be provided to move the flow control member 258 between the closed and open positions. However, in other examples, a non-balanced flow control member may be employed. The body 266 also includes a recessed portion 274 to receive a plug seal assembly 276. The plug seal assembly 276 engages an inner surface 278 of the cage 256 to prevent fluid from leaking between the cage 256 and the regulator body 244.

The body 266 of the flow control member 258 includes a longitudinal bore or opening 280 between a first side or surface 282 and a second side or surface 284. As described in greater detail below, the valve stem 226 is slidably coupled to the flow control member 258 via the bore 280 to allow the valve stem 226 to move through the bore 280 when the flow control member 258 is engaged with the valve seat 254. The valve stem 226 includes a head or connector 286 disposed adjacent the first side 282 or the seal 270 of the flow control member 258. The head 286 includes an enlarged portion or surface 288 that is dimensioned larger than the bore or aperture 280 of the flow control member 258 to prevent the head 286 from sliding through the bore 280 to the second side 284 of the flow control member 258. Thus, the head 286 slidably couples the valve stem 226 and the flow control member 258.

In this example, the head 286 is a fastener that is threadably coupled to a second end 290 of the valve stem 226. Although not shown, in other examples, the head 286 may be integrally formed with the second end 290 of the valve stem 226. For example, the valve stem 226 and the head 286 may be formed from stock via machining or any other suitable manufacturing process(es). In an example having the head 286 integrally formed with the valve stem 226, the first end 224 of the valve stem 226 is inserted within the bore 280 to slidably couple the valve stem 226 to the flow control member 258. In other examples, the head 286 may have any suitable profile or geometry that is larger than the bore 280 of the flow control member 258.

Further, in this example, a biasing element or closing spring 292 is coupled to the flow control member 258 to bias the flow control member 258 toward the valve seat 254. The closing spring 292 is disposed between a first spring seat or the adaptor 242 and a second side or cavity 294 of the flow control member 258 opposite the seal 270. The closing spring 292 holds the flow control member 258 in sealing engagement with the valve seat 254 when the flow control member 258 engages the valve seat 254. The force imparted to the flow control member 258 by the closing spring 292 is less than a force that can damage to the seal 270. Thus, the closing spring 292 imparts a non-destructive, predetermined seat load or closing force to the flow control member 258.

Figure 3:
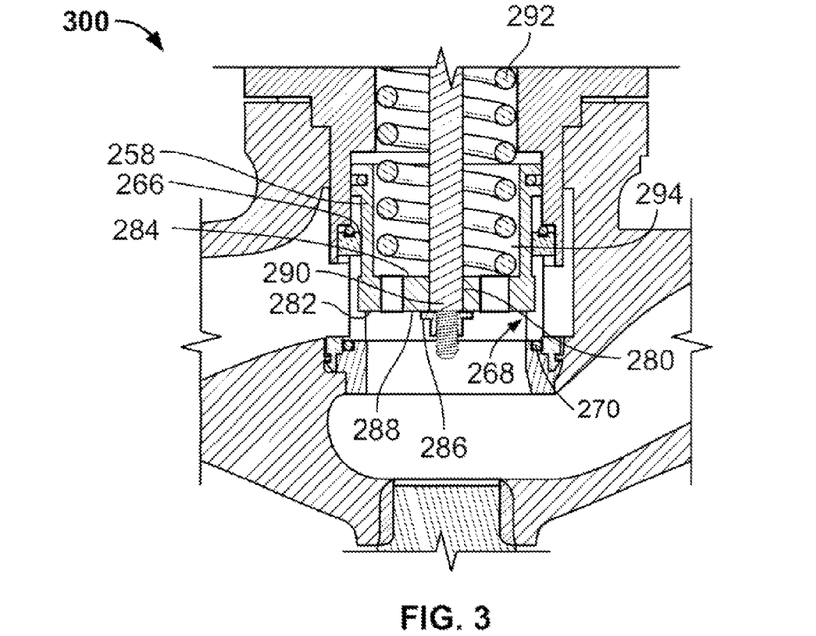
FIG. 3 illustrates the example fluid regulator of FIGS. 2A and 2B in an open position.
Figure 4:
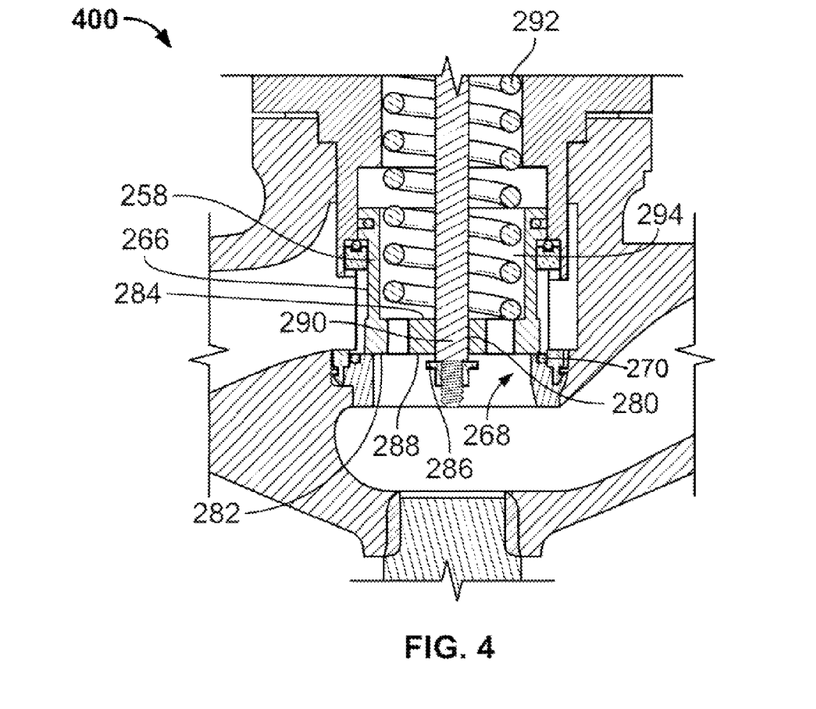
FIG. 4 illustrates the example fluid regulator of FIGS. 2A, 2B, and 3 in a closed position.

FIG. 3 illustrates the fluid regulator 200 in an open position 300 to allow fluid flow through regulator 200. FIG. 4 illustrates the fluid regulator 200 in a closed position 400 where the head 286 disengaged from the flow control member 258.

Referring to FIGS. 2A, 2B, 3 and 4, in operation, the inlet 248 receives pressurized fluid from, for example, an upstream pressurized fluid source. The sensing chamber 220 receives or senses the pressure of the pressurized fluid at the inlet 140 via a sensing line (not shown) coupled to the port 222. A pressure differential across the diaphragm 208 provided by the pressure of the fluid in the sensing chamber 220 and the pressure or force imparted by the loading element 206 causes the diaphragm 208 and, thus, the valve stem 226 to move toward or away from the valve seat 254. In other words, the diaphragm 208 moves the flow control member 258 away from the valve seat 254 to the open position 300 to allow fluid flow through the regulator body 244 when the pressure of the pressurized fluid at the inlet 248 is greater than the pre-set load or pressure provided by the loading element 206.

For example, when the pressure of the pressurized fluid at the inlet 248 exerts a force on the second side 218 of the diaphragm 208 that is greater than the force exerted on the first side 214 of the diaphragm 208 by the loading element 206, the diaphragm 208 and the valve stem 226 move toward the upper casing 212 to compress the loading element 206. In turn, the head 286 at the second end 290 of the valve stem 226 engages the first side 282 of the flow control member 258, thereby causing the flow control member 258 to move away from valve seat 254 to allow fluid flow between the inlet 248 and the outlet 250 (e.g., the open position 300). In other words, the head 286 operatively couples the flow control member 258 and the loading element 206 and/or the diaphragm 208 when the fluid regulator 200 is in the open position 300. The pressure of the fluid decreases as the fluid flows between the inlet 248 and the outlet 250. Increasing the force exerted by the loading element 206 on the first side 214 of the diaphragm 208 (e.g., via the adjustor 238) requires a higher or greater force to be exerted on the second side 218 of the diaphragm 208 by the pressure of the pressurized fluid at the inlet 248 to move the flow control member 258 to the open position 300.

When the pressure of the pressurized fluid at the inlet 248 is substantially equal to or less than the pre-set load or predetermined pressure provided by the loading element 206 to the first side 214 of the diaphragm 208, the loading element 206 expands to cause the diaphragm 208 and the valve stem 226 to move toward the lower chamber 220. In turn, as shown in the position 400 of FIG. 4, the head 286 disengages or moves away from the first side 282 of the flow control member 258 as the valve stem 226 slides within the bore 280 of the flow control member 258. In other words, the sliding valve stem 226 operatively disengages or decouples the loading element 206 and/or the diaphragm 208 from the flow control member 258.

When the head 286 disengages or moves away from the first side 282 of the flow control member 258, the closing spring 292 continues to bias the flow control member 258 toward the valve seat 254. The closing spring 292 holds the flow control member 258 in sealing engagement with the valve seat 254 when the head 286 is disengaged from the flow control member 258. In other words, the closing spring 292 provides a seat load to the flow control member 258 so that the seal 270 sealingly engages the valve seat 254 to prevent or restrict fluid flow between the inlet 248 and the outlet 250.

Further, the head 286 disengages or moves away from the flow control member 258 to relieve the flow control member 258 of a loading force or pre-set force imparted by the loading element 206 when the flow control member 258 is engaged with the valve seat 254. Thus, the seal 270 of the flow control member 258 sealingly engages the valve seat 254 under a load imparted by the closing spring 292 instead of a load imparted by the loading element 206. This is advantageous because the closing spring 292 provides a smaller seat load (although sufficient to provide a tight shut-off) than would otherwise be imparted to the flow control member 258 by the loading element 206 if the valve stem 226 was fixedly coupled to the flow control member 258 (e.g., as shown in FIG. 1). Thus, in contrast to the known fluid regulator 100 of FIG. 1, the seat load imparted on the seal 270 of the example fluid regulator 200 can be controlled or predetermined by the force of the closing spring 292, which is significantly less than the seat load imparted by the loading element 126 to the seal 136 of FIGS. 1A and 1B.

Thus, slidably coupling the valve stem 226 and the flow control member 258 as described herein is advantageous because it significantly reduces or prevents the seal 270 from becoming damaged during, for example, maintenance or shipment of the fluid regulator 200. For example, when the loading element 206 is adjusted to a desired set point and the pressure in the sensing chamber 220 is less than the force provided by the loading element 206 (e.g., atmospheric pressure), the sliding connection between the flow control member 258 and the valve stem 226 relieves the pre-set load or force imparted by the loading element 206 from the seal 270 of the flow control member 258 by operatively disengaging or decoupling the loading element 206 and the flow control member 258. Allowing the valve stem 226 to slide through the flow control member 258 when the flow control member 258 engages the valve seat 254 as shown in FIG. 4 operatively disengages or decouples the loading element 206 and the flow control member 258.

Although certain apparatus have been described herein, the scope of coverage of this patent is not limited thereto. To the contrary, this patent covers all apparatus fairly falling within the scope of the appended claims either literally or under the doctrine of equivalents.

What is claimed:

1. A fluid regulator comprising:
   means for regulating a fluid pressure at an inlet of the fluid regulator relative to a pressure set-point provided by means for loading the fluid regulator;
   means for actuating the means for regulating, the means for actuating having means for sensing that defines a loading chamber and a sensing chamber, the loading chamber to receive the means for loading and the sensing chamber to sense the fluid pressure at an inlet of the fluid regulator;
   means for operatively decoupling a force imparted to the means for regulating by the means for loading when the fluid pressure at the inlet is less than the pressure set-point provided by the means for loading and the means for regulating is in a closed position to prevent or restrict fluid flow through the fluid regulator; and
   means for providing a seat load to the means for regulating when the means for regulating is in the closed position.

2. A fluid regulator of claim 1, wherein the means for operatively decoupling comprises means for slidably coupling the means for regulating and the means for actuating such that the means for slidably coupling engages the means for regulating to move the means for regulating away from a valve seat when the inlet fluid pressure is greater than the pressure set-point and the means for slidably coupling moves away from the means for regulating when the inlet fluid pressure is less than the pressure set-point.

3. A fluid regulator, comprising:
   an actuator having a loading chamber and a sensing chamber opposite the loading chamber, the loading chamber to receive a loading element and the sensing chamber to sense a pressure of a fluid at an inlet of the fluid regulator;
   a flow control member having a body that includes a longitudinal bore between a first end and a second end;
   a valve stem disposed in the bore of the flow control member to couple the flow control member and the actuator; and
   a connector to slidably couple the valve stem and the flow control member, the connector to move away from the flow control member to operatively decouple the flow control member from a loading force imparted by the loading element of the fluid regulator when the flow control member engages a valve seat of the fluid regulator.

4. A fluid regulator of claim 3, further comprising a biasing element to bias the flow control member toward the valve seat and to provide a seat load to the flow control member when the connector moves away from the flow control member.

5. A fluid regulator of claim 4, wherein the biasing element exerts a force to a first side of the flow control member to bias the flow control member toward the valve seat.

6. A fluid regulator of claim 5, wherein the connector engages a second side of the flow control member opposite the first side to move the flow control member away from the valve seat to allow fluid flow through the fluid regulator when a pressure in the sensing chamber is greater than the pressure provided by the loading element.

7. A fluid regulator of claim 6, wherein the valve seat includes a seal to prevent fluid leakage between the inlet and an outlet of the fluid regulator when the fluid regulator is in a closed position.

8. A fluid regulator of claim 7, wherein the seal comprises an elastomeric material.

9. A fluid regulator of claim 8, wherein the seal sealingly engages the valve seat when the fluid regulator is in a closed position.

10. A fluid regulator of claim 3, wherein the connector comprises a fastener threadably coupled to an end of the valve stem.

11. A fluid regulator of claim 3, wherein the actuator further comprises a sensor to define the loading chamber and the sensing chamber, wherein a pressure differential across the sensor provided by the loading element and the inlet fluid pressure causes the valve stem to move toward or away from the valve seat.

12. A fluid regulator of claim 11, wherein the loading element comprises a control spring that biases the sensor and the valve stem toward the valve seat of the fluid regulator.

13. A fluid regulator of claim 12, further comprising a diaphragm head disposed in the sensing chamber to provide a travel stop when the pressure differential across the sensor causes the valve stem to move toward the valve seat.

14. A fluid regulator of claim 3, wherein the connector operatively decouples the flow control member from the loading force imparted by the loading element when a pressure in the sensing chamber is removed.

15. A fluid regulator comprising:
   an actuator having a sensor that defines a loading chamber and a sensing chamber opposite the loading chamber, the loading chamber to receive a loading element and the sensing chamber to sense a pressure of a fluid at an inlet of the fluid regulator;
   a plug having a bore therethrough;
   a stem to couple the plug to the sensor, the stem slidably coupled to the plug via the bore to allow the stem to move through the bore when the plug is engaged with a seat of the fluid regulator, the stem having a head to disengage from the plug when the plug is in engagement with the seat to operatively decouple the plug from a loading force imparted by the loading element, the head to engage the plug to move the plug away from the seat; and a spring coupled to the plug to hold the plug in sealing engagement with the seat when the head is disengaged from the plug.

16. A fluid regulator of claim 15, wherein a first end of the stem includes the head and a second end of the stem is fixedly coupled to the sensor of the fluid regulator.

17. A fluid regulator of claim 15, wherein the head comprises a fastener threadably coupled to the first end of the stem.

18. A fluid regulator of claim 15, wherein the plug includes a seal that sealingly engages the seat of the fluid regulator to prevent or restrict fluid flow between an inlet and an outlet when the fluid regulator is in a closed position.

19. A fluid regulator of claim 18, wherein the seal comprises an elastomeric seal, and wherein the spring imparts a seat load to the seal when the plug sealingly engages the seat.

20. A fluid regulator of claim 15, further comprising a travel stop to limit movement of the stem toward the seat when the pressure differential across the sensor of the fluid regulator causes the stem to move toward the seat.

* * * * *

UNITED STATES PATENT AND TRADEMARK OFFICE
CERTIFICATE OF CORRECTION

PATENT NO. : 8,474,786 B2  
APPLICATION NO. : 12/786093  
DATED : July 2, 2013  
INVENTOR(S) : Schneider

Page 1 of 1

It is certified that error appears in the above-identified patent and that said Letters Patent is hereby corrected as shown below:

In the Claims

Column 9, line 13 (claim 17), delete "claim 15" and insert -- claim 16 --.

Signed and Sealed this  
Thirty-first Day of December, 2013

Margaret A. Focarino  
*Commissioner for Patents of the United States Patent and Trademark Office*